US010543482B2

(12) United States Patent
Okada et al.

(10) Patent No.: US 10,543,482 B2
(45) Date of Patent: Jan. 28, 2020

(54) CATALYST SOLUTION FOR ELECTROLESS PLATING

(71) Applicant: Rohm and Haas Electronic Materials LLC, Marlborough, MA (US)

(72) Inventors: Hiroki Okada, Niigata (JP); Shenghua Li, Niigata (JP); Shinjiro Hayashi, Niigata (JP)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 35 days.

(21) Appl. No.: 14/529,127

(22) Filed: Oct. 30, 2014

(65) Prior Publication Data
US 2015/0118406 A1    Apr. 30, 2015

(30) Foreign Application Priority Data

Oct. 30, 2013 (JP) ................................ 2013-225314

(51) Int. Cl.
*B01J 31/22* (2006.01)
*C23C 18/52* (2006.01)
*C23C 18/30* (2006.01)

(52) U.S. Cl.
CPC .......... *B01J 31/2295* (2013.01); *C23C 18/30* (2013.01); *C23C 18/52* (2013.01)

(58) Field of Classification Search
None
See application file for complete search history.

(56) References Cited

U.S. PATENT DOCUMENTS

| 2006/0254504 | A1 | 11/2006 | Dai et al. |
| 2008/0277140 | A1 | 11/2008 | Kurosaka et al. |
| 2010/0048380 | A1* | 2/2010 | Calabrese Barton ........................ H01M 4/881 502/5 |
| 2013/0020201 | A1 | 1/2013 | Yotoriyama et al. |

FOREIGN PATENT DOCUMENTS

| JP | 2007138218 A | 6/2007 |
| JP | 2007138218 A | 6/2007 |

OTHER PUBLICATIONS

Takai et al et al.,(JP 2007138218, a machine translation is enclosed).*
Azab et al. Journal of Chemical & Engineering Data, 2012, 57, 2890-2895.*
Search Report for Taiwan Patent Application No. 103137570 dated Aug. 4, 2015.
Extended Search Report for corresponding European Application No. 14 19 0993, dated Mar. 5, 2015.
Search report for corresponding China Application No. 201410810631.X dated Apr. 1, 2017.
Search Report for Chinese Patent Application No. 201410810631.X dated Aug. 30, 2016.
Hassan A. Azab, et al., Coordination Tendency of Some Biologically Important Zwitterionic Buffers toward Metal Ion Nucleotide Complexes at Different Temperatures, Journal of Chemical & Engineering Data, vol. 57, No. 10, p. 2890-2895.

* cited by examiner

*Primary Examiner* — Yun Qian
(74) *Attorney, Agent, or Firm* — John J. Piskorski

(57) ABSTRACT

The present invention relates to a stable palladium ion catalyst aqueous solution for electroless metal plating that does not use boric acid and can be used stably over a wide pH range. The catalyst solution for electroless plating of the present invention contains palladium ion, palladium ion complexing agent, and a specific amine compound and is alkaline.

7 Claims, No Drawings

CATALYST SOLUTION FOR ELECTROLESS PLATING

FIELD OF THE INVENTION

The present invention relates to a stable catalyst solution for electroless plating. More specifically, the present invention relates to a stable palladium ion catalyst aqueous solution for electroless metal plating that does not use boric acid and is stable over a wide pH range.

BACKGROUND OF THE INVENTION

Electroless metal plating is a known method for depositing a metal layer on a substrate surface. Electroless metal plating is used in various industries, including decorative plating and the manufacture of electronic components. Electroless metal plating is also widely used in the formation of electrical circuits on printed circuit boards. A catalyst must adhere to the surface in advance when conducting electroless plating on the surface of a nonconductive article. Palladium-tin colloid catalysts have been used as the catalyst in the past. Palladium-tin colloid catalysts are made by mixing tin(II) chloride and palladium chloride in an acidic solution.

However, palladium-tin colloid catalysts tend to aggregate readily. Since the aggregated colloid does not adhere uniformly to the surface of the article to be plated, the amount of plating deposited in the vicinity of the colloid becomes far greater, and metal deposits unevenly on the article during electroless plating. Uneven electroless plating deposition is said to be related to lowered adhesiveness between the plating film and substrate and lowered insulating property. Requests based on environmental issues in recent years have also led to demands for the development of tin-free catalysts.

So-called palladium ion catalysts in which palladium ion is stabilized by a complexing agent are being developed as substitutes for palladium-tin colloid catalysts. The use of amine compounds as complexing agents is known to not only form complexes of the palladium ion but also to heighten the catalyst-imparting property. For example, JP Kokai 61-15983 discloses a catalyst for electroless plating containing complexes obtained by dissolving at least one compound of palladium(II), silver(I), copper(I), copper(II), and nickel(II) in an amide JP Kokai 2007-138218 discloses a concentrated catalyst solution for electroless plating containing a divalent palladium compound and an amine complexing agent, discloses oxalic acid, tartaric acid, acetic acid, citric acid, phthalic acid, 2-(N-morpholino)ethanesulfonic acid, and the like as examples of buffers for pH adjustment, and describes concrete examples of buffer solution using boric acid. 2-(N-morpholino)ethanesulfonic acid is known as a compound that exhibits a buffering effect in the acidic region of pH 5.5-7.0. U.S. Pat. No. 5,503,877 discloses complex compounds containing metal having at least one organic ligand that are complex compounds in which the complex is present in the form of an oligomer or polymer. Amine compounds are given as examples of the organic ligand, and borates, carbonates, phosphates, and acetates are given as examples of buffers. The superiority of using boric acid as the buffer is specifically stated.

However, the boric acid used in these references is considered to be an environmentally hazardous substance and further restriction of its use is expected in the future. Substitutes for boric acid are therefore being sought. The present inventors also determined as based on their research that when boric acid is used as a buffer, the solution is stable and the catalyst performance is good in strongly alkaline region of pH 11 and above, but problems such as precipitation of palladium and lowered catalyst-imparting capability due to variations in complexing power arise when used in the weakly alkaline region. Consequently, it was not possible to impart catalyst adequately to substrates that employ polyimide resins and the like that deteriorate readily upon contact with highly alkaline solutions.

SUMMARY OF THE INVENTION

Therefore, the purpose of the present invention is to provide a stable catalyst solution that does not use boric acid, which is an environmentally hazardous substance, and can be used not only in the strongly alkaline region but also in the weakly alkaline region.

DETAILED DESCRIPTION OF THE INVENTION

In this specification, the terms "catalyst solution" and "catalyst bath" are used interchangeably, and "plating solution" and "plating bath" are used interchangeably. ° C. means degrees Celsius; g/L means grams per liter; mg/L means milligrams per liter; µm means micrometer; and kN/m means kilonewtons per meter. In addition, percent (%) means wt % unless otherwise noted in this specification. All numerical ranges are inclusive and combinable in any order except where it is clear that such numerical ranges are construed to add up to 100%.

As a result of in-depth studies, the present inventors discovered that a catalyst solution that is stable over a wide pH range from strongly alkaline region to weakly alkaline region is obtained by adding specific compounds to a catalyst solution containing palladium ion and complexing agent thereof and thereby perfected the present invention.

Specifically, the present invention relates to a catalyst solution containing palladium ion and a palladium ion complexing agent that also contains a compound represented by general formula (1) disclosed below. This catalyst solution can be used over a wide pH range from the strongly alkaline region to the weakly alkaline region.

The present invention also relates to a method for forming a plating film on the surface of an article to be plated using the above catalyst solution.

The catalyst solution for electroless plating of the present invention is a catalyst solution having a pH higher than 7 containing palladium ion, palladium ion complexing agent, and a compound represented by the following general formula (1).

Chemical Formula 1

(1)

In general formula (1), $R^1$ and $R^2$ each independently represent a hydrogen atom, linear, branched, or cyclic alkyl group having 1-17 carbon atoms, or aryl group. $R^1$ and $R^2$ may each be substituted by a hydroxyl group, hydroxyalkyl group, or cycloalkyl group. Examples of $R^1$ and $R^2$ include a hydrogen atom, methyl group, ethyl group, n-propyl group, isopropyl group, n-butyl group, isobutyl group, t-butyl group, hexyl group, cyclohexyl group, octyl group, decyl group, hydroxyethyl group, 2-hydroxyethyl group, 3-hydroxypropyl group, 4-hydroxybutyl group, phenyl group, 1-methylphenyl group, 3-methylphenyl group, triethanol group, ethanesulfonic acid group, methylene amide group, and hydroxypropylsulfonic acid group. However, $R^1$ and $R^2$ may not simultaneously be hydrogen atoms.

$R^1$ and $R^2$ may bond to each other and form a ring, and they may bond together with hetero atoms and form a ring. Examples of hetero atoms include an oxygen atom and nitrogen atom. Examples of when $R^1$ and $R^2$ form a ring include the formation of a piperidine ring containing $R^1$, $R^2$, and amine nitrogen atoms and the formation of a morpholine ring and piperazine ring containing $R^1$, $R^2$, hetero atoms of oxygen or nitrogen atoms, and amine nitrogen atoms.

$R^3$ represents an alkylene group having 1-14 carbon atoms. $R^3$ may be substituted by a hydroxyl group, alkyl group, or hydroxyalkyl group. Examples of $R^3$ include a methylene group, ethylene group, propylene group, and 2-hydroxypropylene group.

A represents $SO_3X$ or $COOX$. X represents a monovalent cation. Examples include a hydrogen ion, sodium ion, potassium ion, and the like.

Compounds represented by general formula (1) have a buffering action in the alkaline region. Here, the alkaline region means a pH of 7 or higher, preferably 7.5 or higher, and more preferably 8 or higher. The alkaline region is also preferably 12 or lower, more preferably 11.5 or lower. Having a buffering action means that the change in pH when a catalyst solution containing a compound represented by general formula (1) is stored for two months at room temperature after preparation is preferably 0.5 or less, more preferably 0.3 or less, and even more preferably 0.1 or less.

While not being bound by theory, the compound represented by general formula (1) used in the present invention is believed to have the effect of secondarily chelating the palladium ion together with acting as a buffer to keep the catalyst solution in the alkaline region. Therefore, it is believed to stabilize the palladium ion and suppress precipitation together with keeping the pH of the catalyst solution in a specific alkaline region as is discussed below.

Compounds represented by general formula (1) are secondary or tertiary amines. When a primary amine is used instead of a compound represented by general formula (1), the buffering effect and chelating effect are both low and the effects of the present invention are not achieved.

The content of compound represented by general formula (1) varies depending on the content of palladium ion and is one or more times, preferably two or more times, by molar ratio in relationship to the palladium ion. The content of the compound represented by general formula (1) is 20 times or less, preferably 15 times or less, by molar ratio in relationship to the palladium ion.

Examples of compounds represented by general formula (1) include 2-cyclohexylaminoethanesulfonic acid, 3-cyclohexylaminopropanesulfonic acid, diethanol glycine, trishydroxymethylmethyl-3-aminopropanesulfonic acid, trishydroxymethylmethylamino-2-hydroxypropanesulfonic acid, and trishydroxymethylmethyl-2-aminoethanesulfonic acid; preferred are 2-cyclohexylaminoethanesufonic acid, 3-cyclohexylaminopropanesulfonic acid, and diethanol glycine.

Palladium ions can be obtained by dissolving a palladium compound that produces palladium ions in aqueous solution in water. Examples of such palladium compounds include palladium chloride, palladium fluoride, palladium bromide, palladium iodide, palladium nitrate, palladium sulfate, palladium oxide, palladium sulfide, and the like. One or more of these can be used.

The content of palladium ions is preferably 0.001 g/L (9.5 μM) or higher, more preferably 0.01 g/L or higher, based on the total amount of catalyst aqueous solution. The content of palladium ions is also preferably 1 g/L (9.5 mM) or lower, more preferably 0.5 g/L or lower, based on the total amount of catalyst aqueous solution.

The catalyst solution of the present invention contains a palladium ion complexing agent. Compounds known in the past can be used as the palladium ion complexing agent, but amine compounds are especially preferred. The use of amine compounds as the complexing agent makes it possible to not only complex the palladium ion but also to heighten the catalyst-imparting property.

Examples of the palladium ion complexing agent include bipyridine, picolylamine, ethylenediamine, 2-aminopyridine, nicotinic acid, 4-aminopyridine, 2-aminoethylpyridine, 3-hydroxymethylpyridine, and the like. Bipyridine, picolylamine, ethylenediamine, 2-aminopyridine, 2-aminoethylpyridine, and other such diamines among them are especially preferred.

The content of palladium ion complexing agent is decided by the content of palladium ion and is preferably 0.5 or more, more preferably 0.8 or more, and preferably 5 or less, more preferably 1.2 or less, by molar ratio in relationship to the palladium ion.

The catalyst solution of the present invention has an alkaline pH higher than 7. This is because a precipitate of palladium tends to be produced and the effect as a catalyst solution declines when the pH is less than 7. The catalyst solution of the present invention is characterized particularly by the fact that the target pH is stabilized over a wide range from the weakly alkaline region to the strongly alkaline region. This is because the catalyst solution acts as a buffer because it contains a compound represented by general formula (1). The usefulness is therefore higher and the useable pH range wider than conventional catalyst solutions containing boric acid, as is discussed below.

The pH of the catalyst solution of the present invention is higher than 7, preferably 7.5 or higher, more preferably 8 or higher. The pH of the catalyst solution of the present invention is also preferably 12 or lower, more preferably 11.5 or lower. The pH can be adjusted to the target value by an acid or base or another such known pH adjuster. Hydrochloric acid, sulfuric acid, nitric acid, and the like can be used as acids. Sodium hydroxide, potassium hydroxide, sodium carbonate, and the like can be used as bases.

The catalyst aqueous solution of the present invention can be prepared, for example, by adding palladium chloride or another such palladium salt to hydrochloric acid, stirring the solution until the palladium salt dissolves completely, then adding bipyridine or another such palladium ion complexing agent and a compound represented by general formula (1), adding water to make the prescribed volume, and then adjusting the pH to the target value by sodium hydroxide aqueous solution.

The following process can be used when conducting electroless metal plating of a nonconductive substrate using the catalyst aqueous solution of the present invention. Electroless copper plating is discussed as an example.

First, the substrate is degreased by washing with acid or alkali solution or the like. After washing with deionized water, it is microetched by a known etching solution followed by washing with deionized water, washing with acid, and washing with deionized water, a catalyst is then imparted to the substrate surface using the catalyst solution of the present invention. The catalyst is imparted by bringing the substrate into contact for 2-5 minutes with a catalyst solution that has been adjusted to 20-60° C. The substrate is then washed with deionized water and brought into contact with a reducing agent solution. Sodium hypophosphite, formaldehyde, stannous chloride, dimethylamine borane, lithium aluminum hydride, lithium borohydride, sodium borohydride, and the like can be used as reducing agents. The content of reducing agent in the reducing agent solution varies depending on the type of reducing agent used. For example, when sodium hypophosphite is used, it is 20 g/L to 100 g/L. Washing with deionized water and electroless copper plating are conducted thereafter. A known electroless copper plating solution such as CUPOSIT™ 328 Electroless Copper (manufactured by Rohm and Haas Electronic Materials Co., Ltd.) can be used during electroless copper plating.

The substrate can also be brought into contact with a pretreatment solution called predip solution before bringing the catalyst solution of the present invention and the substrate into contact. Predip solution is a solution having a catalyst-activating and catalyst solution-stabilizing effect. The pH is adjusted to basically the same as that of the catalyst solution so that there are no pH variations in the catalyst solution when the substrate brings predip solution into the catalyst solution. Since the catalyst solution of the present invention can be used over a wide range from weakly alkaline to strongly alkaline, the solution properties of the predip solution can also be selected over a wide pH range, and the use of the catalyst solution of the present invention has the advantage of widening the range of choice of predip solution.

Examples of the nonconductive substrate that is the article to be plated include thermosetting resins, thermoplastic resins, or resin substrates that combine these. Examples of resins used in resin substrates include, but are not limited to, acetal resins, acrylic resins, cellulose resins, epoxy resins, polyimide resins, phenol resins, cyanate resins, ABS, bis-maleimide-triamine resins, polyimide, mixtures of these, and the like. The nonconductive substrate used in the present invention is not limited to resins substrates, but may be a substrate using glass, ceramic, porcelain, resin, paper, cloth, combinations of these, and other such organic and inorganic materials. Substrates that employ metal clad or unclad materials are also substrates that can be metal plated using the catalyst solution of the present invention.

The catalyst solution of the present invention is useful since it can also be used on resins such as polyimide resins that are deteriorated readily by strong alkali since it can be used in the weakly alkaline region.

A printed circuit board is also an example of a substrate. Such printed circuit boards contain thermosetting resin, thermoplastic resin, and combinations of these and also contain mixtures of resin and glass fibers and other such fibers. Concrete examples of resins that can be used include, but are not limited to, those given as examples of resins used in resin substrates above.

EXAMPLES

The present invention is explained based on working examples below. However, these working examples do not limit the scope of the present invention.

Production of Evaluation Substrates

Evaluation Substrate A (Substrate for Evaluation of Covering Performance of Electroless Copper Plating)

An FR-4 substrate (MCL-E67, thickness 1.6 mm, manufactured by Hitachi Chemical Co., Ltd.), which is a glass epoxy resin substrate with copper foil attached, was etched by sodium persulfate solution, and the copper foil was completely removed.

Evaluation Substrate B (Evaluation of Electroless Copper Deposition on a Glass Cloth Site)

Desmear treatment (swelling, permanganic acid treatment, and neutralization) was carried out using a glass epoxy copper-clad board R-1705 (FR-4, thickness 1.6 mm, through hole diameter 0.9 mm) manufactured by Panasonic Corporation.

Evaluation Substrate C (Substrate for Measurement of Peel Strength)

A copper foil substrate with film ABF-CX-92 manufactured by Ajinomoto Co., Ltd. attached was subjected to swelling, permanganic acid treatment, and neutralization treatment.

Working Examples 1-4

Catalyst stock solution A of the following composition was prepared in advance and used by adjusting to the target pH using a pH adjuster (hydrochloric acid or sodium hydroxide) in each working example.

(Catalyst Stock Solution A)

| | |
|---|---|
| Palladium chloride | 200 mg/L as palladium |
| 35% Hydrochloric acid | 3 mL/L |
| Bipyridine | 1.5 mM |
| 2-Cyclohexylaminoethanesulfonic acid | 27 mM |
| Remainder | Deionized water |

The pH value was adjusted to that stated in Table 2 by adding pH adjuster to catalyst stock solution A. Using the above evaluation substrates A and B, the substrates obtained after treatment by the processes stated in Table 1 were evaluated. Furthermore, in evaluation of the covering performance of electroless copper plating, the surface of substrate A was examined visually after plating and the existence of any unplated locations (skip plating) was confirmed. In evaluation of electroless copper deposition on a glass cloth site, the throwing of plating into the through holes of substrate B was examined by bright-field microscope and rated from 5 (best) to 0.5 (backlight test). Each catalyst solution was also allowed to stand at room temperature after preparation, and the stability of the catalyst solution was confirmed. The results appear in Table 2.

TABLE 1

| Step | Chemicals used | Temperature (° C.) | Time (min) |
|---|---|---|---|
| Washing | C-140*: 20% | 60 | 5 |
| Hot-water washing | Tap water | 45 | 1 |
| Washing (twice) | Deionized water | Room temperature | 2 |
| Microetching | Sodium persulfate: 150 g/L 98% sulfuric acid: 1% Copper sulfate 5H$_2$O: 4 g/L | Room temperature | 1 |
| Washing | Deionized water | Room temperature | 1 |
| Acid washing | 10% sulfuric acid: 10% | Room temperature | 1 |

TABLE 1-continued

| Step | Chemicals used | Temperature (° C.) | Time (min) |
|---|---|---|---|
| Washing | Deionized water | Room temperature | 1 |
| Catalyst imparting | Catalyst solution | 45 | 5 |
| Washing | Deionized water | Room temperature | 2 |
| Reduction treatment | 30 g/L sodium hypophosphite | 30 | 10 |
| Washing | Deionized water | Room temperature | 2 |
| Electroless copper plating | Cuposit 328 | 30 | 20 |

*Circubond™ 140 cleaner (manufactured by Rohm & Haas Electronic Materials Co., Ltd.)

Comparative Examples 1-4

The same procedure as in Working Examples 1-4 was carried out except that 2-cyclohexylaminoethanesulfonic acid was not used.

Comparative Example 5-8

The same procedure as in Working Examples 1-4 was carried out except that 27 mM of boric acid was used instead of 27 mM of 2-cyclohexylaminoethanesulfonic acid.

Comparative Example 9

The same procedure as in Working Example 2 was carried out except that 1.9 mM of glycine was used instead of 27 mM of 2-cyclohexylaminoethanesulfonic acid.

Comparative Examples 10 and 11

The same procedure as in Working Examples 1 and 3 was carried out except that 2.0 mM of 2-amino-2-hydroxymethyl-1,3-propanediol was used instead of 27 mM of 2-cyclohexylaminoethanesulfonic acid.

Comparative Examples 12-15

The same procedure as in Working Examples 1-4 was carried out except that bipyridine was not used.

TABLE 2

| | Catalyst solution | | | Catalyst performance | | Bath stability | |
|---|---|---|---|---|---|---|---|
| Example | Complexing agent | Chemical | pH | State of copper deposition | Backlight test | Precipitate produced (time) | pH after standing (time) |
| Working example 1 | Bipyridine | 2-Cyclohexylaminoethanesulfonic acid | 8.5 | Good | 4.75-5 | None (2 months) | 8.5 (2 months) |
| Working example 2 | Bipyridine | 2-Cyclohexylaminoethanesulfonic acid | 9.5 | Good | 4.75-5 | None (2 months) | 9.5 (2 months) |
| Working example 3 | Bipyridine | 2-Cyclohexylaminoethanesulfonic acid | 10.5 | Good | 4.75-5 | None (2 months) | 10.5 (2 months) |
| Working example 4 | Bipyridine | 2-Cyclohexylaminoethanesulfonic acid | 11.5 | Good | 4.75-5 | None (2 months) | 11.5 (2 months) |
| Comparative example 1 | Bipyridine | — | 8.5 | Skip plating | 3.5-4 | Yes (24 hrs) | 7.7 (24 hrs) |
| Comparative example 2 | Bipyridine | — | 9.5 | Skip plating | 4-4.5 | Yes (24 hrs) | 8.4 (24 hrs) |
| Comparative example 3 | Bipyridine | — | 10.5 | Skip plating | 4-4.5 | Yes (72 hrs) | 9.8 (72 hrs) |
| Comparative example 4 | Bipyridine | — | 11.5 | Good | 4.75-5 | None (2 months) | 10.8 (2 months) |
| Comparative example 5 | Bipyridine | Boric acid | 8.5 | Skip plating | 4-4.5 | Yes (72 hrs) | 8.0 (72 hrs) |
| Comparative example 6 | Bipyridine | Boric acid | 9.5 | Skip plating | 4-4.5 | Yes (72 hrs) | 8.9 (72 hrs) |
| Comparative example 7 | Bipyridine | Boric acid | 10.5 | Skip plating | 4-4.5 | Yes (1 week) | 10.1 (1 week) |
| Comparative example 8 | Bipyridine | Boric acid | 11.5 | Good | 4.75-5 | None (2 months) | 11.2 (1 week) |
| Comparative example 9 | Bipyridine | Glycine | 9.5 | No deposition at all | —*1 | Yes (24 hrs) | 8.4 (24 hrs) |
| Comparative example 10 | Bipyridine | 2-Amino-2-hydroxymethyl-1,3-propanediol | 8.5 | No deposition at all | —*1 | Yes (24 hrs) | 8.5 (2 months) |
| Comparative example 11 | Bipyridine | 2-Amino-2-hydroxymethyl-1,3-propanediol | 10.5 | No deposition at all | —*1 | Yes (72 hrs) | 10.5 (2 months) |
| Comparative example 12 | — | 2-Cyclohexylaminoethane sulfonic acid | 8.5 | No deposition at all | —*1 | Yes (24 hrs) | 8.2 (24 hrs) |
| Comparative example 13 | — | 2-Cyclohexylaminoethane sulfonic acid | 9.5 | No deposition at all | —*1 | Yes (24 hrs) | 9.0 (24 hrs) |

TABLE 2-continued

| Example | Catalyst solution Complexing agent | Chemical | pH | Catalyst performance State of copper deposition | Backlight test | Bath stability Precipitate produced (time) | pH after standing (time) |
|---|---|---|---|---|---|---|---|
| Comparative example 14 | — | 2-Cyclohexylaminoethane sulfonic acid | 10.5 | No deposition at all | —*1 | Yes (24 hrs) | 9.8 (24 hrs) |
| Comparative example 15 | — | 2-Cyclohexylaminoethane sulfonic acid | 11.5 | No deposition at all | —*1 | Yes (24 hrs) | 11.0 (24 hrs) |

*1Not tested due to complete absence of catalyst-imparting effect

Working Example 5

The following catalyst stock solution B was prepared.
(Catalyst Stock Solution B)

| | |
|---|---|
| Palladium chloride | 200 mg/L as palladium |
| 35% Hydrochloric acid | 3 mL/L |
| Picolylamine | 1.6 mM |
| 3-Cyclohexylaminopropanesulfonic acid | 27 mM |
| Remainder | Deionized water |

The same procedure as in Working Example 1 was carried out except that catalyst stock solution B was used instead of catalyst stock solution A and the pH was adjusted to 10. The results are shown in Table 3.

Comparative Example 16

The same procedure as in Working Example 5 was carried out except that 27 mM of 3-cyclohexylaminopropanesulfonic acid was not used.

Comparative Example 17

The same procedure as in Working Example 5 was carried out except that 27 mM of boric acid was used instead of 3-cyclohexylaminopropanesulfonic acid.

Comparative Example 18

The same procedure as in Working Example 5 was carried out except that picolylamine was not used.

Working Examples 6 and 7

The following catalyst stock solution C was prepared.
(Catalyst Stock Solution C)

| | |
|---|---|
| Palladium chloride | 200 mg/L as palladium |
| 35% Hydrochloric acid | 3 mL/L |
| Ethylenediamine | 2 mM |
| Diethanol glycine | 5.7 mM |
| Remainder | Deionized water |

The same procedure as in Working Example 1 was carried out except that catalyst stock solution C was used instead of catalyst stock solution A and the pH was adjusted to 8 and 10, respectively. The results are shown in Table 4.

Comparative Examples 19 and 20

The same procedure as in Working Examples 6 and 7 was carried out except that diethanol glycine was not used.

Comparative Examples 21 and 22

The same procedure as in Working Examples 6 and 7 was carried out except that 27 mM of boric acid was used instead of 27 mM of diethanol glycine.

Comparative Examples 23 and 24

The same procedure as in Working Examples 6 and 7 was carried out except that ethylenediamine was not used.

TABLE 3

| Example | Catalyst solution Complexing agent | Chemical | pH | Catalyst performance State of copper deposition | Backlight test | Bath stability Precipitate produced (time) | pH after standing (time) |
|---|---|---|---|---|---|---|---|
| Working example 5 | Picolylamine | 3-Cyclohexylaminopropanesulfonic acid | 10 | Good | 4.75-5 | None (2 months) | 10 (2 months) |
| Comparative example 16 | Picolylamine | — | 10 | Skip plating | 3.5-4 | Yes (24 hrs) | 9.0 (24 hrs) |
| Comparative example 17 | Picolylamine | Boric acid | 10 | Skip plating | 4-4.5 | Yes (1 week) | 9.6 (1 week) |
| Comparative example 18 | — | 3-Cyclohexylaminopropanesulfonic acid | 10 | No deposition at all | —*1 | Yes (24 hrs) | 9.6 (24 hrs) |

*1Not tested due to complete absence of catalyst-imparting effect

TABLE 4

| Example | Catalyst solution | | | Catalyst performance | | Bath stability | |
|---|---|---|---|---|---|---|---|
| | Complexing agent | Chemical | pH | State of copper deposition | Backlight test | Precipitate produced (time) | pH after standing (time) |
| Working example 6 | Ethylenediamine | Diethanol glycine | 8.0 | Good | 4.75-5 | None (2 months) | 8.0 (2 months) |
| Working example 7 | Ethylenediamine | Diethanol glycine | 10.0 | Good | 4.75-5 | None (2 months) | 10.0 (2 months) |
| Comparative example 19 | Ethylenediamine | — | 8.0 | Skip plating | 3.5-4 | Yes (24 hrs) | 7.0 (24 hrs) |
| Comparative example 20 | Ethylenediamine | — | 10.0 | Skip plating | 3.5-4 | Yes (24 hrs) | 9.1 (24 hrs) |
| Comparative example 21 | Ethylenediamine | Boric acid | 8.0 | Skip plating | 3.5-4 | Yes (24 hrs) | 7.6 (24 hrs) |
| Comparative example 22 | Ethylenediamine | Boric acid | 10.0 | Skip plating | 3.5-4 | Yes (24 hrs) | 9.7 (24 hrs) |
| Comparative example 23 | — | Diethanol glycine | 8.0 | No deposition at all | —*1 | Yes (24 hrs) | 7.7 (24 hrs) |
| Comparative example 24 | — | Diethanol glycine | 10.0 | No deposition at all | —*1 | Yes (24 hrs) | 9.6 (24 hrs) |

*1 Not tested due to complete absence of catalyst-imparting effect

Working Example 8

Plating of evaluation substrate C was carried out in accordance with the steps in Table 1 using the same catalyst solution as in Working Example 1. A good result of 0.72 kN/m was obtained when the peel strength was measured thereafter.

What is claimed is:

1. A catalyst solution having a pH higher than 7 consisting of water, palladium ions, a palladium compound which provides the palladium ions, palladium ion complexing agent selected from the group consisting of bipyridine, picolylamine, ethylenediamine, 2-aminopyridine, nicotinic acid, 4-aminopyridine, 2-aminoethylpyridine and 3-hydroxymethylpyridine, optionally a pH adjuster selected from the group consisting of hydrochloric acid, sulfuric acid, nitric acid, sodium hydroxide, potassium hydroxide and sodium carbonate, and a compound having a buffering action in the alkaline region represented by the following general formula (1):

Chemical Formula 1

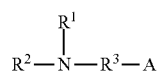

(1)

wherein $R^1$ and $R^2$ each independently represent a hydrogen atom, linear, branched, or cyclic alkyl group having 1-17 carbon atoms, or aryl group; $R^1$ and $R^2$ are optionally substituted by a hydroxyl group, hydroxyalkyl group, or cycloalkyl group; $R^3$ represents an alkylene group having 1-14 carbon atoms and are optionally substituted by a hydroxyl group, alkyl group, or hydroxyalkyl group; A represents $SO_3X$ or COOX; X represents a monovalent cation.

2. The catalyst solution according to claim 1 wherein the palladium ion complexing agent is a compound having 2 or more amino groups.

3. The catalyst solution according to claim 1 wherein the compound represented by general formula (1) is 2-cyclohexylaminoethanesulfonic acid, 3-cyclohexylaminopropanesulfonic acid, or diethanol glycine.

4. The catalyst solution according to claim 1 wherein the content of compound represented by general formula 1 is 1-20 times by molar ratio in relationship to the palladium ions.

5. The catalyst solution according to claim 1, wherein the content of palladium ion complexing agent is 0.5-5 times by molar ratio in relationship to the palladium ions.

6. The catalyst solution according to claim 1, wherein the palladium ions are obtained from the palladium compounds chosen from palladium chloride, palladium fluoride, palladium bromide, palladium iodide, palladium nitrate, palladium sulfate, palladium oxide or palladium sulfide.

7. A method for forming an electroless plating film on a substrate including a step for bringing the substrate into contact with a catalyst solution according to claim 1.

* * * * *